United States Patent
Huang et al.

(10) Patent No.: US 10,904,394 B1
(45) Date of Patent: *Jan. 26, 2021

(54) REMOTE MANAGEMENT OF VOIP DEVICE CONTACT LISTS

(71) Applicant: 8x8, Inc., San Jose, CA (US)

(72) Inventors: Ruiqiang Huang, San Jose, CA (US); Zhishen Liu, San Jose, CA (US); Garth Judge, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,040

(22) Filed: Apr. 16, 2019

Related U.S. Application Data

(63) Continuation of application No. 15/613,915, filed on Jun. 5, 2017, now Pat. No. 10,264,133, which is a continuation of application No. 14/807,172, filed on Jul. 23, 2015, now Pat. No. 9,674,367, which is a continuation of application No. 14/180,504, filed on Feb. 14, 2014, now Pat. No. 9,094,488.

(51) Int. Cl.
| | |
|---|---|
| *H04L 12/66* | (2006.01) |
| *H04M 7/00* | (2006.01) |
| *H04M 3/493* | (2006.01) |
| *H04M 1/253* | (2006.01) |
| *H04M 1/2757* | (2020.01) |
| *H04M 1/27457* | (2020.01) |

(52) U.S. Cl.
CPC ....... *H04M 7/0075* (2013.01); *H04M 1/2535* (2013.01); *H04M 1/2757* (2020.01); *H04M 3/4931* (2013.01); *H04M 1/27457* (2020.01)

(58) Field of Classification Search
None
See application file for complete search history.

(56) References Cited

U.S. PATENT DOCUMENTS

| | | | | |
|---|---|---|---|---|
| 7,277,697 | B2 * | 10/2007 | Desai | H04L 51/24 370/257 |
| 7,289,491 | B2 | 10/2007 | Singh | |
| 8,161,116 | B2 * | 4/2012 | Chaddha | H04M 3/5307 709/206 |
| 8,204,206 | B2 | 6/2012 | Townsend | |
| 8,208,955 | B1 * | 6/2012 | Nelson | H04M 1/2535 379/208.01 |
| 8,233,409 | B2 * | 7/2012 | Jayapalan | H04M 3/2281 370/260 |
| 8,289,951 | B2 * | 10/2012 | Moore | H04L 65/4007 370/352 |
| 8,325,213 | B2 * | 12/2012 | Lamb | H04N 7/147 348/14.01 |

(Continued)

*Primary Examiner* — Sithu Ko
(74) *Attorney, Agent, or Firm* — Crawford Maunu PLLC

(57) ABSTRACT

An apparatus including a server is disclosed for providing data-communications services to and configuring contact lists for a plurality of VoIP-enabled devices. The apparatus includes a data server communicatively connected to the plurality of user-communications devices. In response to receiving a first data message, from a first device not included in the plurality of devices, that includes contact information and identifies one of the plurality of devices, the device management circuit adds a new contact having the contact information to the respective contact list of the identified one of the plurality of devices.

16 Claims, 4 Drawing Sheets

(56) References Cited

U.S. PATENT DOCUMENTS

| | | | |
|---|---|---|---|
| 8,532,089 | B2 | 9/2013 | Dalrymple et al. |
| 8,676,755 | B2 | 3/2014 | Sousa et al. |
| 9,094,488 | B1 | 7/2015 | Huang et al. |
| 2005/0213567 | A1* | 9/2005 | Mullins .................. H04M 3/22 370/352 |
| 2007/0038720 | A1 | 2/2007 | Reding et al. |
| 2007/0112964 | A1 | 5/2007 | Guedalia et al. |
| 2008/0037720 | A1 | 2/2008 | Thomson et al. |
| 2008/0151868 | A1* | 6/2008 | Kezys ................ H04L 12/4641 370/352 |
| 2010/0306185 | A1* | 12/2010 | Smith .................. G06F 16/275 707/709 |
| 2012/0087367 | A1 | 4/2012 | Anikin et al. |
| 2013/0103771 | A1* | 4/2013 | Lv ........................ G06F 16/955 709/206 |
| 2013/0282744 | A1* | 10/2013 | Hartman ............. H04M 3/5183 707/758 |
| 2015/0188853 | A1* | 7/2015 | Ma ....................... H04L 51/063 709/206 |

\* cited by examiner

REMOTE MANAGEMENT OF VOIP DEVICE CONTACT LISTS

FIELD OF THE INVENTION

The present disclosure relates to management of voice-over-IP (VoIP) enabled devices.

OVERVIEW

VoIP technology allows for calls to be made using internet connections. VoIP technology can be used in place of traditional analog/digital phone lines and can also be used to supplement traditional phone lines. Depending upon the type of VoIP servers and the VoIP provider's capabilities, VoIP calls can be made between VoIP users and/or to anyone having a telephone number (e.g., calls to local, long distance, mobile, and/or international numbers). VoIP calls can be initiated and received using a general purpose computer (e.g., using software that provides a soft phone interface), specialized hardware (e.g., a VoIP-enabled telephone), or specialized interface equipment (e.g., a VoIP adapter for an analog telephone).

SUMMARY

Aspects of the present disclosure are directed to network applications that address challenges including those discussed above, and that are applicable to a variety of applications, devices, systems and methods. These and other aspects of the present disclosure are exemplified in a number of implementations and applications, some of which are shown in the figures and characterized in the claims section that follows.

According to one or more embodiments, an apparatus is disclosed for providing VoIP services to a plurality of VoIP-enabled devices having respective contact lists, and for configuring contact lists of the plurality of VoIP-enabled devices. The apparatus includes a VoIP server communicatively connected to the plurality of VoIP-enabled devices. The VoIP server includes a call routing circuit configured to route VoIP calls to and from the plurality of VoIP-enabled devices communicatively-coupled to the VoIP server. The VoIP server also includes a device management circuit coupled to the call routing circuit and configured to maintain a list of IP addresses for each of the plurality of VoIP-enabled devices. In response to receiving a first data message, from a first device not included in the plurality of VoIP-enabled devices, that includes contact information, and identifies one of the plurality of VoIP-enabled devices, the device management circuit adds a new contact having the contact information to the respective contact list of the identified one of the plurality of VoIP-enabled devices.

In some embodiments, a method is provided for populating contact lists of a VoIP system including a plurality of VoIP-enabled devices and a VoIP server. The VoIP server is configured to route VoIP calls to and from the plurality of VoIP-enabled devices and each of the plurality of VoIP-enabled devices includes a respective one of the contact lists. Using the VoIP server, VoIP calls are routed to and from the plurality of VoIP-enabled devices. In response to receiving a first data message, from a first device not included in the plurality of VoIP-enabled devices, a new contact is added to one of the contact lists. The received message includes contact information and an account identifier indicating one of the plurality of VoIP-enabled devices. The new contact includes the contact information included in the first data message and is added to the respective contact list corresponding to the one of the plurality of VoIP-enabled devices indicated by the account identifier in the first data message.

In some embodiments, a VoIP system is provided. The system includes a plurality of VoIP-enabled devices, each having a respective contact list, and a non-VoIP device. The system also includes a VoIP server communicatively-coupled to the plurality of VoIP-enabled devices and the non-VoIP device. The VoIP server includes a call routing circuit and a device management circuit. The call routing circuit is configured and arranged to route VoIP calls to and from the plurality of VoIP-enabled devices communicatively-coupled to the VoIP server. The device management circuit coupled to the call routing circuit and is configured to maintain a list of IP addresses for each of the plurality of VoIP-enabled devices. In response to receiving a first data message from the non-VoIP device that includes contact information and an account identifier indicating one of the plurality of VoIP-enabled devices, the device management circuit adds a new contact having the contact information to the respective contact list corresponding to the one of the plurality of VoIP-enabled devices indicated by the account identifier in the first data message.

BRIEF DESCRIPTION OF THE DRAWINGS

The invention may be more completely understood in consideration of the following detailed description of various embodiments of the invention in connection with the accompanying drawings, in which.

Figure 1:
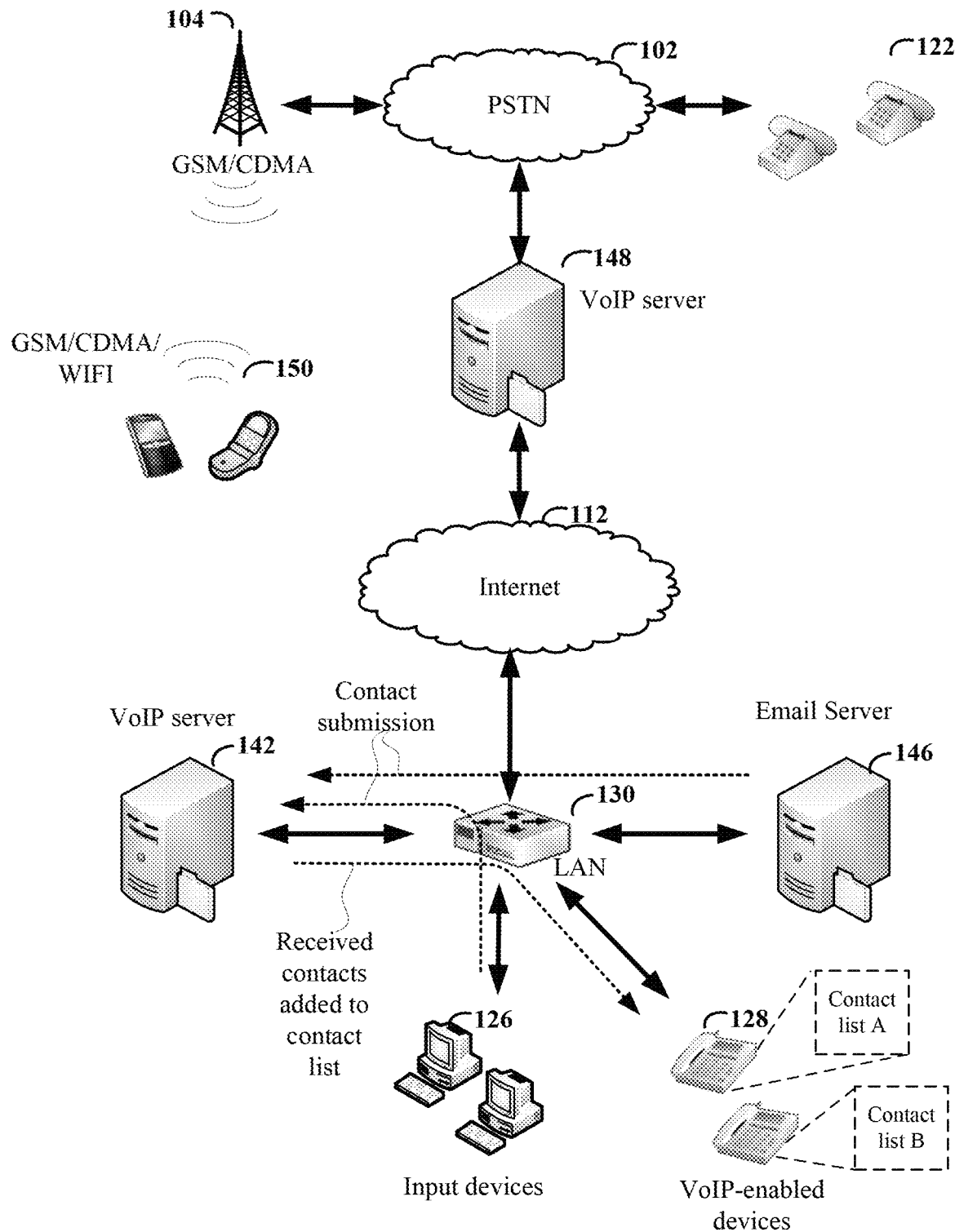
FIG. 1 shows a telecommunication network consistent with one or more embodiments of the present disclosure.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various methods, systems, and apparatuses for telecommunication. For ease of explanation, the examples and embodiments herein are primarily described with reference to VoIP telecommunication services. While the disclosed embodiments are not necessarily limited to such applications, various aspects of the present disclosure may be appreciated through a discussion of various examples using this context.

In some disclosed embodiments, an apparatus is configured to provide VoIP services to a plurality of VoIP-enabled devices having respective contact lists, and for configuring contact lists of the plurality of VoIP-enabled devices. The apparatus includes a VoIP server communicatively connected to the plurality of VoIP-enabled devices. The VoIP server includes a call routing circuit configured to route VoIP calls to and from the plurality of VoIP-enabled devices communicatively-coupled to the VoIP server. The VoIP server also includes a device management circuit coupled to the call routing circuit and configured to maintain a list of IP addresses for each of the plurality of VoIP-enabled devices. In response to receiving a first data message, from a first device not included in the plurality of VoIP-enabled devices, that includes contact information and identifies one of the plurality of VoIP-enabled devices, the device management circuit adds a new contact having the contact information to the respective contact list of the identified VoIP-enabled device.

In some embodiments, the VoIP server is configured to add the new contact to the respective contact list of the identified VoIP-enabled devices by storing the contact information in a memory of the identified VoIP-enabled device. In some other embodiments, the apparatus includes a database configured to store the respective contact lists of the plurality of VoIP-enabled devices. In this arrangement, the new contact is added to the respective contact list of one of the plurality of VoIP-enabled devices by storing the respective contact information as an entry in the database and associating the entry with the respective contact list corresponding to the VoIP-enabled device in the database.

In some embodiments, the VoIP server may be prompted to add contacts to one of the contact lists by messages received from one or more input devices. The input devices are not included in the plurality of VoIP-enabled devices and provide an alternative mechanism to add/modify contacts. For instance, a user may prompt the management circuit of the VoIP server to add a contact via a graphical-user-interface (GUI) provided by a desktop computer application and/or web-based application. Use of a GUI to input contact information can be much easier than inputting contacts using an IP phone interface. Further, in some embodiments, the GUI may be configured to import and convert contacts from other locations (e.g., a mobile phone service provider).

In some embodiments, an email client application (e.g., Outlook) is configured to prompt a VoIP server to add contacts to a contact list of one of the VoIP devices. For example, the email client may identify possible contacts to be added from client emails. For instance, a sender of an email message may include a telephone number in the signature block of the email message or in an electronic business card (e.g., vCard) attachment to the email message.

In some implementations, in response to displaying an email message that includes a contact telephone number of the email message sender, in the body of the email or in an attachment, the email client may present a GUI mechanism for a user to add the sender to the contact list of one of the VoIP devices. In response to user input selecting the sender as a contact to be added to a contact list, the email client transmits a message to the server. The message includes at least the telephone number of the sender, an alpha-numeric identifier of the sender, and a telephone number of a specified one of the plurality of VoIP-enabled devices associated with the contact list that is to be modified. In one implementation a name included in a signature block of the email message is used as the alpha-numeric identifier of the sender. In another implementation, the email address from which the email message is sent is used as the alpha-numeric identifier of the sender. In another implementation, the alpha-numeric identifier may be retrieved from an electronic business card (e.g., vCard) attachment to the email message. Contact information may identify individuals or groups of people. For example, in some implantations, an alpha-numeric identifier or other contact information for a group may be provided by a text tag in the subject or body of an email. In response to the message, the VoIP server adds a new contact, having the indicated contact information, to the contact list of the specified one of the plurality of VoIP-enabled devices.

In some implementations, an input device (e.g., an email client) may search a target contact list to determine whether or not contact information is already included in the respective contact list prior to prompting the VoIP server to add the contact. For instance, referring again to the email client discussed above, a search may be performed in response to identifying contact information in an email, or in response to the user input selecting the sender as a contact to be added to a contact list. In some other embodiments, the VoIP server may be configured to perform such a search in response to receiving contact information to be added from an input device.

In some embodiments, systems for VoIP communication are provided that include VoIP-enabled devices, a non-VoIP input device, and a VoIP server in various combinations. For example, one such system includes VoIP-enabled devices, a non-VoIP input device, and a VoIP server. Another such system includes a non-VoIP input device and a VoIP server that are configured to provide VoIP services for third party VoIP-enabled devices.

Turning now to the figures, FIG. 1 shows a telecommunication network consistent with one or more embodiments of the present disclosure. The network includes VoIP-enabled devices 128 (e.g., mobile devices, computers, and IP phones) and input devices 126 (e.g., computers) connected on a local area network (LAN) 130. Each of the VoIP enabled devices 128 includes a respective contact list. The contact list of each VoIP enabled device 128 may be stored in a respective memory of the VoIP enabled device, as shown in FIG. 1, or may be stored in an external server or database (e.g., VoIP server 142).

The network includes VoIP servers 142 and 148 configured to route VoIP calls to and from the VoIP-enabled devices 128. The VoIP servers 142 and 148 may route VoIP calls between the VoIP-enabled devices and a number of non-VoIP telecommunication devices (including, e.g., mobile devices (GSM/CDMA/WiFi) 150 or plain-old-telephone-system (POTS) phones 122. The VoIP servers 142 and 148 may route each VoIP call from a source device to an applicable destination device using various networks including, e.g., public switched telephone networks (PSTN) 102, cellular networks 104, and/or the internet 112. For example, in one scenario a VoIP call to a VoIP-enabled device 128 may be routed over the internet 116 to a destination VoIP device 128. In another scenario, a VoIP call to a non-VoIP device (e.g., 122 and 150) may be routed by a first VoIP server 142, over the internet 112, to a second VoIP server 148 in the location of a destination device. The second VoIP server 148 completes the VoIP call by routing the call as a standard voice call over one or more PSTN networks 102 to a destination device 122.

In addition to providing VoIP services, the VoIP server 142 may be configured to manage a set of the VoIP-enabled devices 128. For example, in some embodiments, the VoIP server 142 may maintain/modify respective contact lists of the VoIP-enabled devices 128. For instance, an authorized user may prompt the VoIP server 142 to add a contact to a contact list by providing a data message to the VoIP server that identifies a specific one of the VoIP-enabled devices and includes contact information to be added to a corresponding contact list.

The data message may be provided to the VoIP server from a number of devices. In some embodiments, the data message may be provided to the VoIP server 142 by one or more input devices 126, which are not included in the set of VoIP-enabled devices 128 managed by the VoIP server 142. For instance, a user may prompt the VoIP server 142 to add a contact via a GUI on one of the input devices 126. The GUI may be provided by a desktop computer application executed on the input devices 126 or by a web-based application accessible by the input devices 126. In some embodiments, the input devices 126 may be configured to import and convert contacts from other locations (e.g., a mobile phone service provider). In some embodiments, one or more of the input devices 126 includes an email client application (e.g., Outlook) configured to prompt the VoIP server 142 to add contacts to a contact list of one of the VoIP-enabled devices 128. In some implementations, the email client may automatically identify possible contacts to be added from client emails. For instance, a sender of an email message may include a telephone number in the signature block of the email message. In some embodiments, an email server 146 may be configured to may automatically identify possible contacts to be added from client emails and prompt the VoIP server to add the identified contacts to a corresponding contact list.

Figure 2:
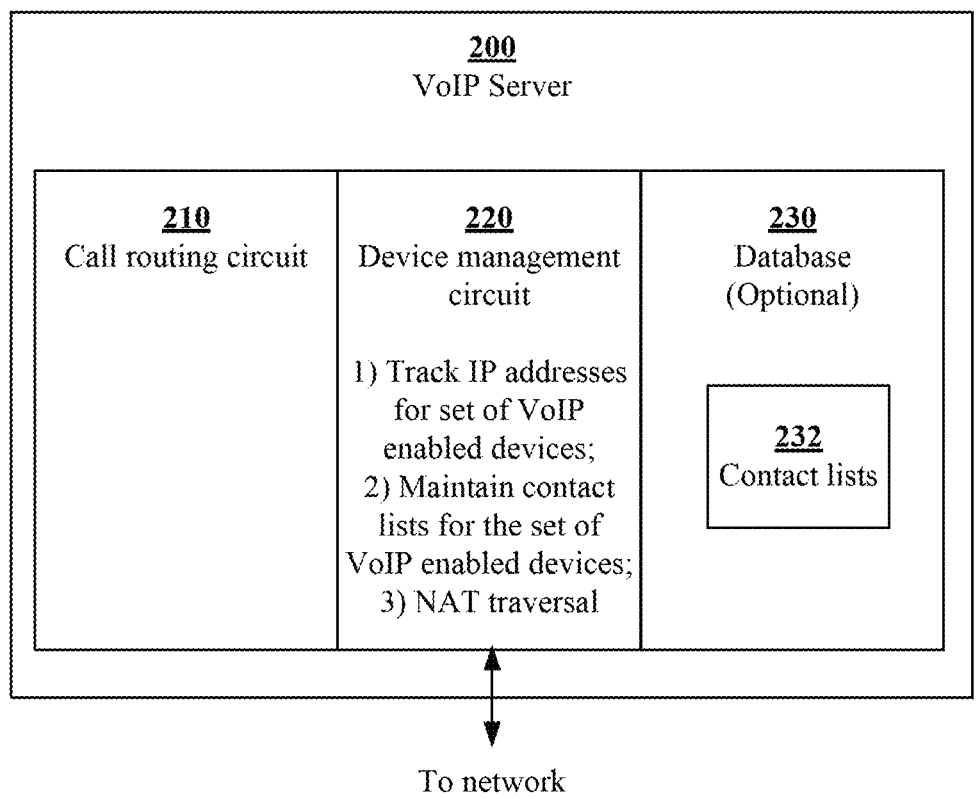
FIG. 2 shows an example VoIP server in accordance with one or more embodiments of the present disclosure.

FIG. 2 shows a VoIP server, in accordance with one or more embodiments of the present disclosure. The VoIP server 200 includes a call routing circuit 210, configured to route VoIP calls to and from VoIP-enabled devices communicatively-coupled to the VoIP server via a network. The VoIP server also includes a device management circuit 220 coupled to the call routing circuit and configured to maintain a list of IP addresses for each of the plurality of VoIP-enabled devices. The list of IP addresses can be used, for example, to determine proper routing of an incoming call to one of the VoIP-enabled devices. The device management circuit 220 is also configured to manage a respective contact list of each of the VoIP-enabled devices. In some embodiments, the device management circuit 220 may also be configured to perform traversal of network address translators (NATs) to maintain a port mapping to communicate with VoIP enabled devices located behind a NAT.

In some embodiments, the device management circuit 220 is prompted to add/remove contacts from a contact list by a data message from an input device, which is not one of the VoIP-enabled devices. The data message includes an identifier of one of the plurality of VoIP-enabled devices and includes contact information to be added to the corresponding contact list. In response to the data message, the device management circuit adds a new contact with the indicated contact information to the respective contact list of the VoIP-enabled devices identified by the data message.

In some implementations, a VoIP-enabled device may include a memory for storing the respective contact list. To add a contact to the list, the device management circuit prompts the VoIP-enabled device to add a contact to the contact list 232 by sending a message indicating the contact information to the VoIP-enabled device. Alternatively, the contact lists may be stored in a central database 230, which may form part of the VoIP server or may be communicatively coupled to the VoIP server via a network. In this arrangement, the new contact is added to the respective contact list of the one of the plurality of VoIP-enabled devices by storing the respective contact information as an entry in the database and associating the entry with the respective contact list corresponding to the one of the plurality of VoIP-enabled devices in the database.

Figure 3:
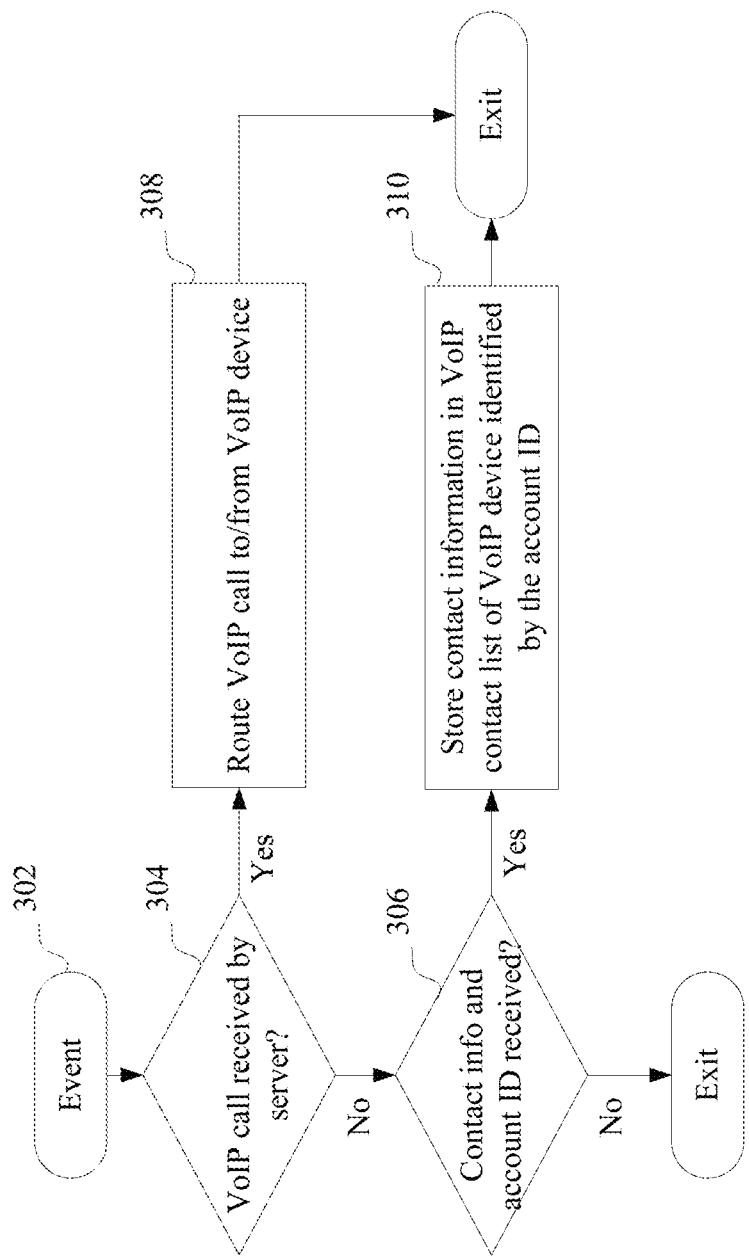
FIG. 3 shows a process for operating a VoIP server, in accordance with one or more embodiments of the present disclosure.

FIG. 3 shows a process for operating a VoIP server, in accordance with one or more embodiments of the present disclosure. The process is initiated by a trigger event 302, such as data being received by the server. If the trigger event is a VoIP call received by the server, decision block 304 directs the process to route the VoIP call to/from a corresponding VoIP device at block 308. If the trigger event is the receipt of contact info and an account ID by the server, decision block 306 directs the server to add a contact with the provided contact information to a contact list of a VoIP device indicated by the account ID at block 310.

As discussed with reference to FIG. 2, the contact list may be stored in either a memory of the VoIP device or in a central database. If the contact list is stored in a memory of the VoIP device, the server may add the contact to the contact list by prompting the VoIP device to store the contact in the memory of the VoIP device. If the contact list is stored in a central database, the server may add the contact to the contact list by storing the respective contact as an entry in the database and associating the entry with the respective contact list corresponding to the VoIP-enabled device.

As indicated above, in some embodiments, a user may prompt a VoIP server to add a contact to a respective contact list using a GUI on an input device. The GUI may be an application executed on the input devices 126 or may be a web-based application accessible by the input devices 126 (e.g., via a web browser). In some embodiments, a GUI is configured to import and convert contacts from other locations (e.g., a mobile phone service provider).

Figure 4:
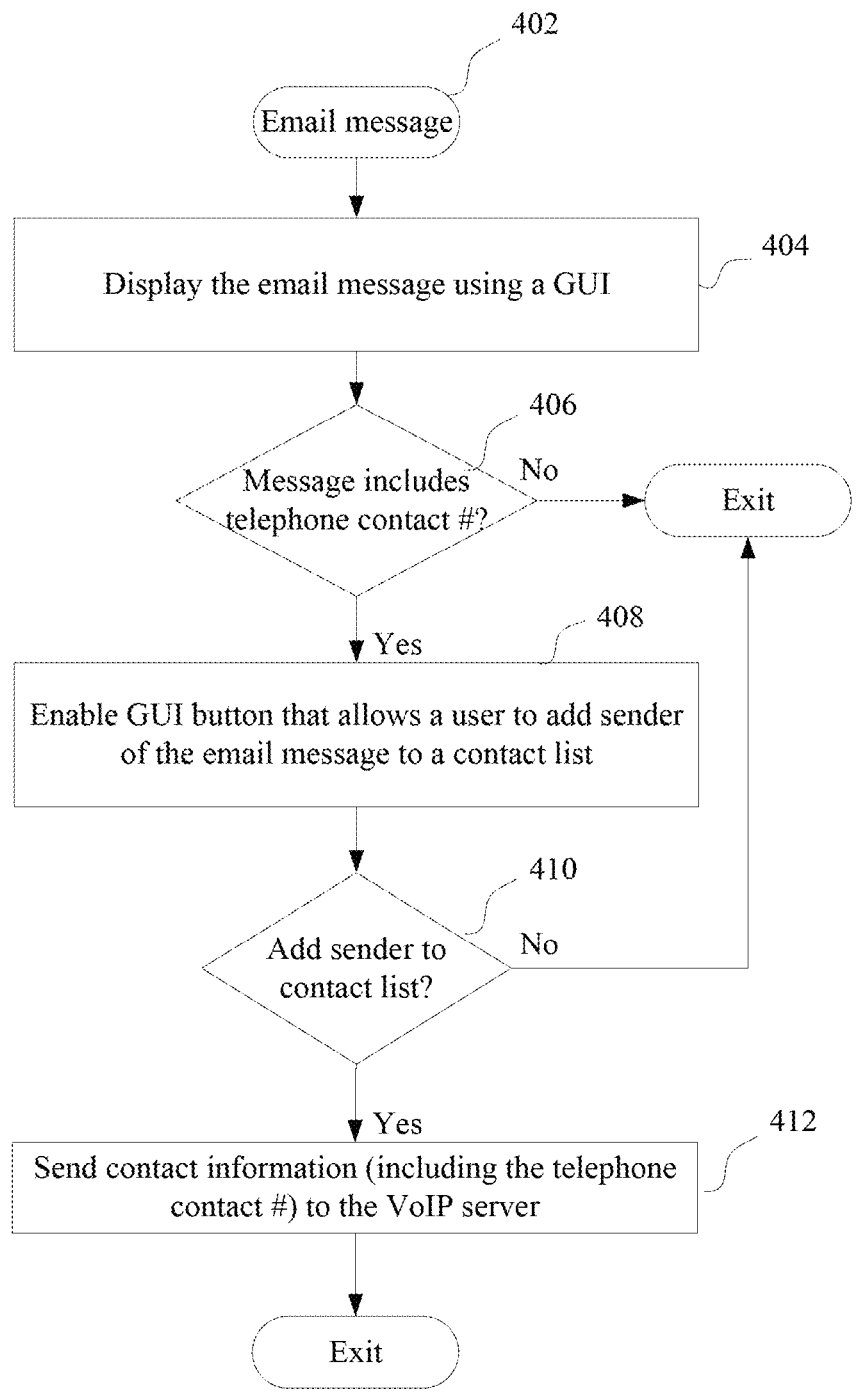
FIG. 4 shows a process for populating a contact list of an IP phone system using data mined from email, in accordance with one or more embodiments of the present disclosure.

In some embodiments, the GUI includes an email client application (e.g., Outlook) configured to automatically identify possible contacts to be added from client emails. FIG. 4 shows a process for populating a contact list of an IP phone system using data mined from email, in accordance with one or more embodiments of the present disclosure. In response to receiving an email message 402, the email message is displayed using a GUI at block 404. If the message includes a telephone contact number, decision block 406 directs the process to enable a GUI button that allows a user to add the sender of the email message to a contact list 408. If the user selects to add the sender to the contact list, decision block 410 directs the process to send contact information (including the telephone number to a VoIP server) at block 412.

The message may include the telephone number of the sender, an alpha-numeric identifier of the sender, and a telephone number of a VoIP-enabled device associated with the contact list that is to be modified. In one implementation, a name included in a signature block of the email message is used as the alpha-numeric identifier of the sender. In another implementation, the email address from which the email message is sent is used as the alpha-numeric identifier of the sender. In response to the message, the VoIP server adds a new contact, having the indicated contact information, to the contact list of the specified one of the plurality of VoIP-enabled devices.

In some implementations, an input device (e.g., an email client) may search a target contact list to determine whether or not contact information is already included in the respective contact list prior to prompting the VoIP server to add the contact at block 412. For instance, referring again to the email client discussed above, a search may be performed in response to identifying contact information in an email, or in response to the user input selecting the sender as a contact to be added to a contact list. In some other embodiments, the VoIP server may be configured to perform such a search in response to receiving contact information to be added from an input device.

The various embodiments as discussed herein may be implemented using a variety of structures and related operations/functions. For instance, one or more embodiments as described herein may be computer-implemented or computer-assisted, as by being coded as software within a coding system as memory-based codes or instructions executed by a computer processor, microprocessor, PC or mainframe computer. Such computer-based implementations may use one or more programmable circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium, which stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. It is intended that the specification and illustrated embodiments be considered as examples only, with a true scope of the invention being indicated by the following claims.

What is claimed is:

1. A data communication services system in which data communication services are provided to a plurality of Internet-enabled communication devices having identification information which are associated with a contact list, the system comprising:
    a data communication server to provide the data communication services by communicatively coupling the plurality of Internet-enabled communication devices with each other, the data communication server including
        a first circuit to route data communications on behalf of the data communication services to and from the plurality of Internet-enabled communication devices, and
        a second circuit to communicate with the first circuit and to
            maintain a list of IP addresses for each of the plurality of Internet-enabled communication devices, and
            in response to receiving, from one of the plurality of Internet-enabled communication devices, a data message including contact information and an account identifier that identifies an account for which the data communication services are provided,
            identifying, from the account identifier, another of the plurality of Internet-enabled communication devices, wherein the one and said another of the plurality of Internet-enabled communication devices are identifiable as corresponding to two different categories of communication devices, and
            prompting said another of the plurality of Internet-enabled communication devices to add, in memory which contains the contact list, new contact information identified in the contact information in the received data message and associated with the one of the plurality of Internet-enabled communication devices.

2. The system of claim 1, further including circuitry to operate a graphical user interface (GUI), the GUI to retrieve and display messages which are conveyed in a typed form, the typed form being compatible with at least one of emails and texts.

3. The system of claim 1, further including circuitry to operate a graphical user interface (GUI), the GUI to retrieve and display email messages communicated by the one and said another of the plurality of Internet-enabled communication devices, wherein in response to the GUI displaying an email message including a contact telephone number of a sender of the email message, the GUI is to select the sender as a contact to be added to the contact list of a specified one of the plurality of Internet-enabled devices.

4. The system of claim 1, further including circuitry to operate a graphical user interface (GUI), wherein in response to the GUI identifying a first message, the GUI is to select a sender of the first message as a contact to be added to the contact list of a specified one of the plurality of Internet-enabled communication devices, and to send the first message to the server, wherein the first message includes at least a telephone number or identification information of the sender.

5. The system of claim 1, further including circuitry to operate a graphical user interface (GUI), wherein in response to the GUI identifying a first message, the GUI is to determine whether a sender of the first message is already included in the contact list of the specified one of the plurality of Internet-enabled communication devices.

6. The system of claim 1, further including circuitry which is to respond to a first message being identified, by providing an indication of whether a sender of the first message is already included in the contact list of the specified one of the plurality of Internet-enabled communication devices.

7. The system of claim 1, further including circuitry to operate a graphical user interface (GUI), wherein in response to the GUI or one of the plurality of Internet-enabled communication devices identifying a first message, the GUI is to determine whether a sender of the first message is identifiable by a signature block of the message.

8. The system of claim 1, further including circuitry to operate a graphical user interface (GUI), wherein the GUI is to import and convert contacts from a plurality of sources.

9. The system of claim 1, wherein said another of the plurality of Internet-enabled communication devices is a communication device enabled for VoIP communications, and wherein one of the two different categories of communication devices is associated with said another of the plurality of Internet-enabled communication devices being enabled for VoIP communications.

10. The system of claim 1, further including circuitry to operate a graphical user interface (GUI), wherein the GUI is to respond to a user prompting that contact information be added via the GUI, by GUI retrieving an adding the contact information.

11. A method for use with a data communication services system which provides data communication services to a plurality of Internet-enabled communication devices having identification information which are associated with a contact list, the method comprising, via a data communications server:
: providing the data communication services by communicatively coupling the plurality of Internet-enabled communication devices with each other,
: routing communications on behalf of the data communication services calls to and from the plurality of Internet-enabled communication devices,
: maintaining a list of IP addresses for each of the plurality of Internet-enabled communication devices,
: in response to receiving a data message from one of the plurality of Internet-enabled communication devices, the data message including contact information and an account identifier that identifies an account for which the data communication services are provided,
: identifying from the account identifier, another of the plurality of Internet-enabled communication devices, wherein the one and said another of the plurality of Internet enabled communication devices are identifiable as corresponding to two different categories of communication devices, and
: prompting said another of the plurality of Internet-enabled communication devices to add in memory which contains the respective contact list, new contact information associated with the one of the plurality of Internet-enabled communication devices.

12. The method of claim 11, further including using circuitry to operate a graphical user interface (GUI), and in response to the GUI identifying a first message, using the GUI to determine whether a sender of the first message is already included in the contact list of the specified one of the plurality of Internet-enabled communication devices.

13. The method of claim 11, further including using circuitry which is to respond to a first message being identified, by providing an indication of whether a sender of the first message is already included in the contact list of the specified one of the plurality of Internet-enabled communication devices.

14. The method of claim 11, further including using circuitry to operate a graphical user interface (GUI), and in response to the GUI or one of the plurality of Internet-enabled communication devices identifying a first message, using the GUI to determine whether a sender of the first message is identifiable by a signature block of the message.

15. The method of claim 11, further including using circuitry to operate a graphical user interface (GUI), and using the GUI to import and convert contacts from a plurality of sources.

16. The method of claim 11, wherein one of the two different categories of communication devices is associated with one of the other of the plurality of Internet-enabled communication devices being enabled for a certain type of communications over the Internet.

* * * * *